United States Patent [19]

Mayrand

[11] 3,873,160
[45] Mar. 25, 1975

[54] DEVICE FOR PROTECTING A WHEEL DURING REMOVAL AND INSTALLATION OF LUG NUTS

[76] Inventor: James L. Mayrand, 11 Cary Rd., Cloquet, Minn. 55720

[22] Filed: May 30, 1974

[21] Appl. No.: 474,409

[52] U.S. Cl. ............ 301/5 R, 301/9 DN, 81/53 R, 81/180 R
[51] Int. Cl. .................... B60b 29/00, B25b 29/00
[58] Field of Search .......... 301/9 DN, 14, 5 R, 9 R, 301/9 SB, 37 R, 37 AT, 37 H; 81/1 R, 53 R, 180 R

[56] References Cited
UNITED STATES PATENTS
1,556,941  10/1925  Liddell ............................ 301/9 DN
1,712,322  5/1929  Bachrach ........................ 301/9 DN
1,735,124  11/1929  Miller ............................. 301/9 DN
3,577,818  5/1971  Cramer ........................... 81/180 R Primary Examiner—Robert S. Ward, Jr.
Attorney, Agent, or Firm—Wicks & Nemer

[57] ABSTRACT

A device for protecting a wheel of a vehicle during removal and installation of lug nuts including a flat ring having a plurality of spaced holes adapted to receive the lug nuts extended therethrough for engagement by a wrench whereby the wrench cannot contact the wheel.

6 Claims, 5 Drawing Figures

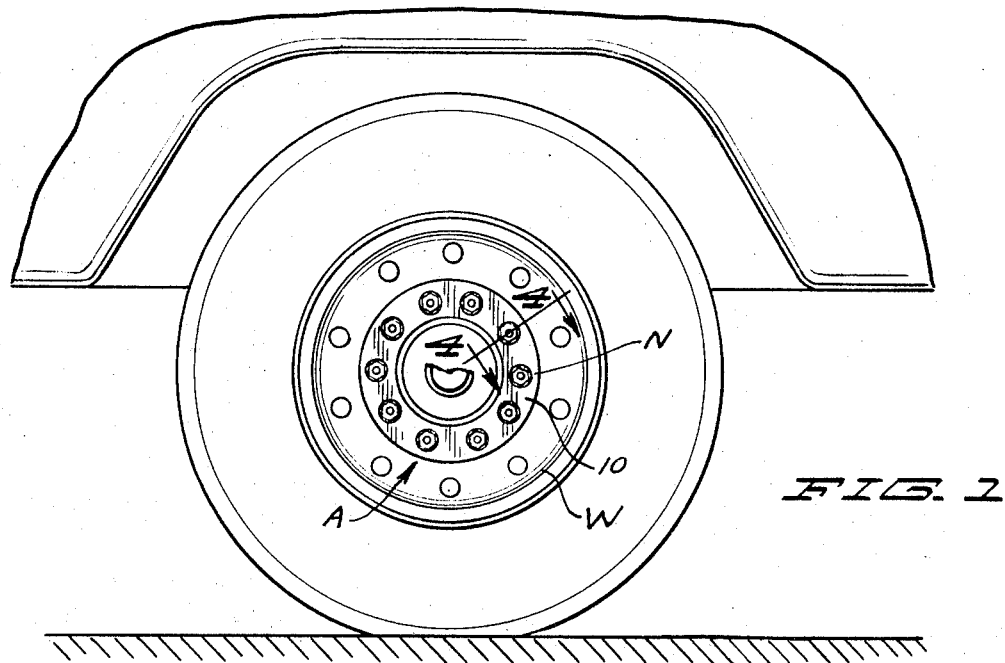
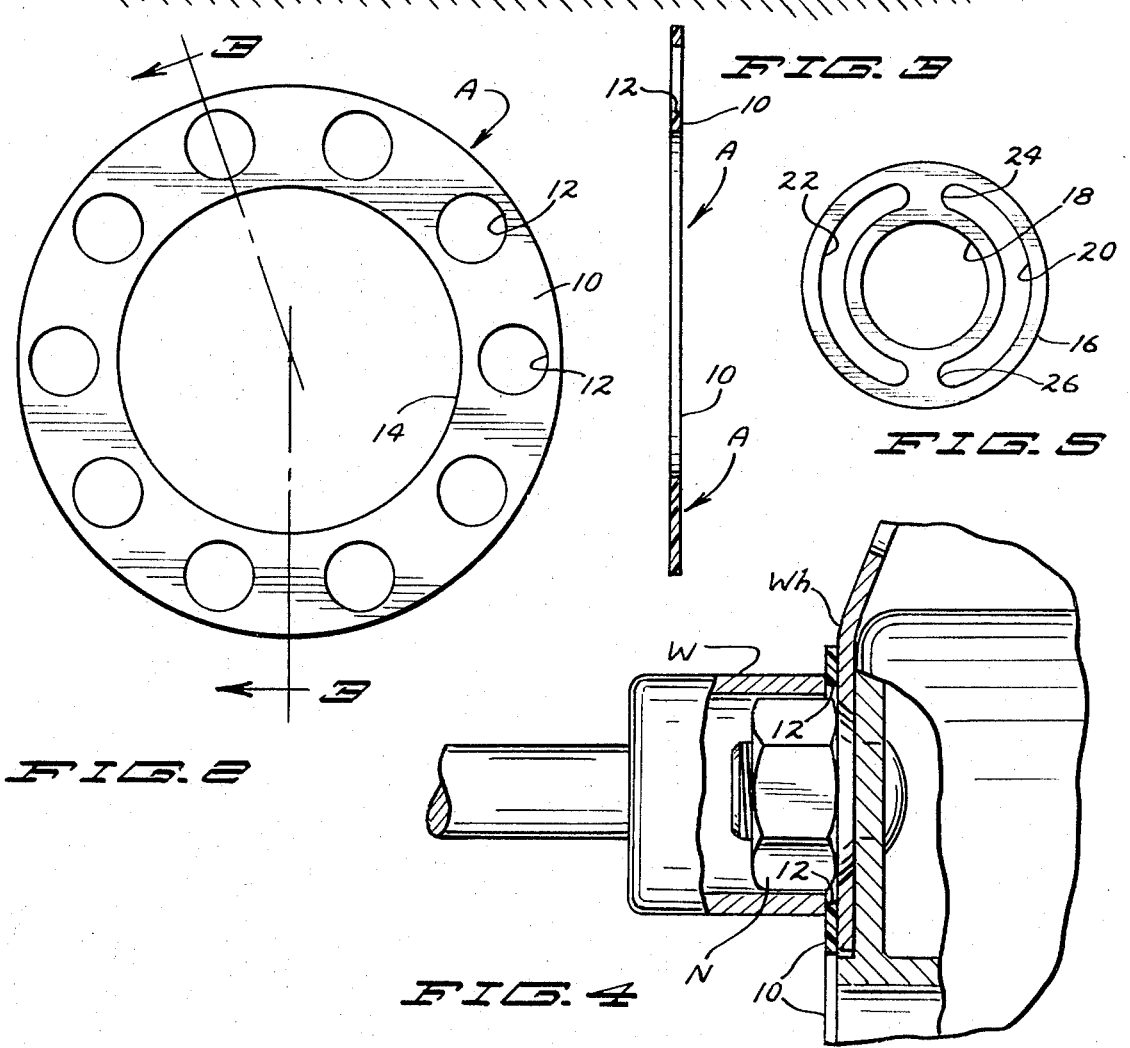

DEVICE FOR PROTECTING A WHEEL DURING REMOVAL AND INSTALLATION OF LUG NUTS

SUMMARY

The invention relates to a device for use in connection with the removal or installation of the lug nuts of a wheel of a vehicle whereby the wheel is not damaged by the end of the wrench used to actuate the nuts.

With many vehicle owners there is pride in maintaining the smooth polished surface of the wheel. In removing or installing lug nuts of a wheel, it is virtually impossible not to rough up the surface of the wheel with the end of the lug wrench. Additionally, the wheel can be roughed enough to eventually damage the same to the extent that it will cause fatigue of the metal in the wheel.

The subject device consists of a flat circular ring having a plurality of spaced holes of a spacing and a diameter to receive the lug nuts therethrough. The ring is of a thickness whereby the wrench is fully engageable upon the nut, and with the device upon the nuts the end of the wrench contacts the device and does not rough up the surface of the wheel adjacent the lug nuts.

In the drawings forming part of this application:

FIG. 1 is a side elevational view of a vehicle wheel with the wheel protector embodying the invention shown in operative position on the wheel.

FIG. 2 is a side elevational view of the wheel protector enlarged with respect to the illustration thereof in FIG. 1.

FIG. 3 is sectional view on the line 3—3 of FIG. 2.

FIG. 4 is an enlarged sectional view on the line 4—4 of FIG. 1 with a lug wrench shown in position on the lug nut.

FIG. 5 is a side elevational view of a further embodiment of the invention.

Referring to the drawings in detail, the wheel protector A includes a body member in the form of the flat ring 10 which in a preferred form is substantially one-eighth of an inch thick. The radial width of the ring is substantially 2½ inches. The outside diameter is approximately 13¾ inches and with the width 2½ inches, the inside diameter of the opening 14 is approximately 8¾ inches.

The ring 10 is formed with spaced holes 12 equal in number to the lug nuts found on most truck wheels. The preferred form includes dimensions whereby the protector fits most truck wheels. The holes 12 are of a diameter and location so that the same slip over the lug nuts of a wheel, but with a close fit so that a lug wrench upon a lug nut makes positive and full contact with the ring. The opening 14 in the center is large enough so that there is no interference with the wheel spindle when the protector A is in operative position as in FIG. 1.

The radial width of the ring is such that it prohibits the lug removal wrench W from contacting the surface of the wheel as the wrench is rotated in removal of the lug nuts N or in applying the lug nuts. In removing the nuts, the protector is placed on the wheel so that the nuts on the hub extend through the holes 12. As a result, the protector A remains on the hub, and when the wrench W is placed about a nut the end of the wrench contacts the protector A and not the wheel. As the wrench is turned, the end thereof rubs on the protector and as a result the wheel at the hub and adjacent lug nut is not damaged. The ring may be made of hard plastic, metal or the like.

In FIG. 5 is found a further embodiment of the invention which includes the flat ring 16 substantially one-eighth of an inch thick. The radial width of the ring is substantially 2½ inches with the outside diameter approximately 13¾ inches and the inside diameter of opening 18 is approximately 8¾ inches. The ring is formed with semi-circular openings 20 and 22 spaced by the cross bars 24 and 26. The openings 20 and 22 have a width only slightly greater than the diameter of a lug nut whereby the nuts are received in the openings, but a wrench on the nuts contacts the ring but not the wheel.

I claim:

1. A device for protecting a wheel during removal and installation of the lug nuts thereof comprising:
   a. a substantially flat body member,
   b. void means formed in said body through which the lug nuts of a wheel extend for engagement by a wrench.

2. The device of claim 1 in which said body member is a circular ring.

3. The device of claim 2 in which said void means includes a plurality of spaced voids.

4. The device of claim 3 in which each of said voids is circular.

5. The device of claim 1 in which said void means includes a plurality of spaced voids.

6. The device of claim 5 in which said spaced voids are semi-circular in formation.

* * * * *